(12) United States Patent
Gha

(10) Patent No.: US 8,705,093 B2
(45) Date of Patent: Apr. 22, 2014

(54) CONTROL POINT, IMAGE FORMING APPARATUS AND METHOD FOR PROCESSING EVENT

(75) Inventor: Hwang-Hyeon Gha, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 874 days.

(21) Appl. No.: 12/923,002

(22) Filed: Aug. 27, 2010

(65) Prior Publication Data
US 2011/0134468 A1    Jun. 9, 2011

(30) Foreign Application Priority Data
Dec. 8, 2009    (KR) .............................. 2009-0121026

(51) Int. Cl.
*G06F 3/12*    (2006.01)

(52) U.S. Cl.
USPC .................. 358/1.15; 358/1.1; 710/19; 710/8; 710/18; 710/15; 370/235; 370/229

(58) Field of Classification Search
None
See application file for complete search history.

(56) References Cited

U.S. PATENT DOCUMENTS

| | | | |
|---|---|---|---|
| 5,608,898 A * | 3/1997 | Turpin et al. .......................... | 1/1 |
| 8,271,967 B2 * | 9/2012 | Wu ................................ | 717/168 |
| 8,370,538 B2 * | 2/2013 | Nakamura ....................... | 710/19 |
| 8,432,564 B2 * | 4/2013 | Kitahara et al. ............. | 358/1.15 |

* cited by examiner

*Primary Examiner* — Paul F Payer
(74) *Attorney, Agent, or Firm* — Staas & Halsey LLP

(57) ABSTRACT

An image forming apparatus is provided, which includes a communication interface (CI) to search at least one connectable control point (CP), an event management unit to set event notification information for the CP found by the search, and if an event occurs in the image forming apparatus, to select the CP to receive a notification of the event based on the event notification information, a storage unit to store the set event notification information, and a digital living network alliance (DLNA) stack to control the CI so that the event is notified to the selected CP.

26 Claims, 7 Drawing Sheets

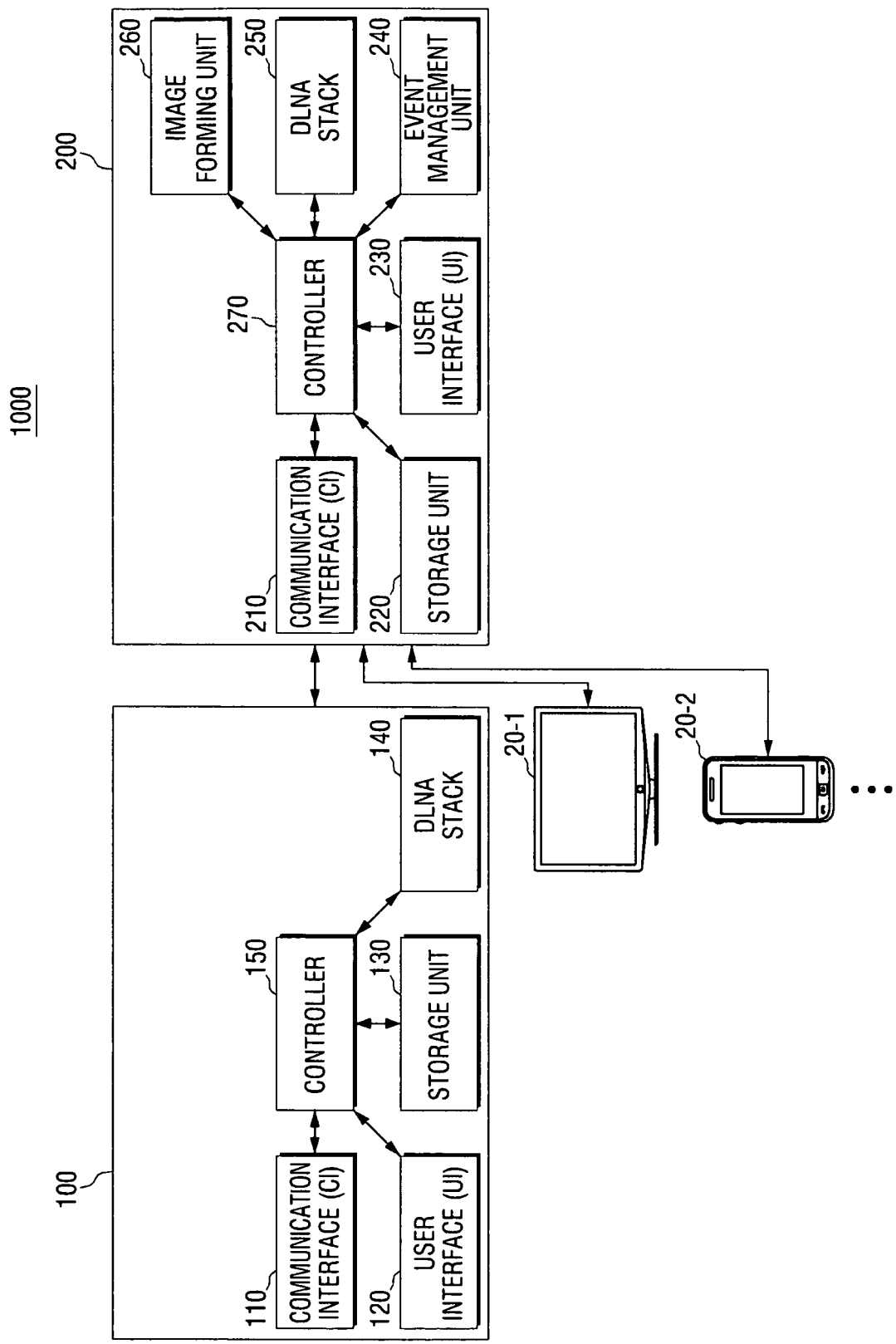

FIG. 2

| Number 281 | CP Name 282 | Event notify method 283 | Event category 280 284 ||
|---|---|---|---|---|
| | | | Printer status 284-1 | Job status 284-2 |
| 1 | Father's Mobile Phone | Receive only my event | Receive | Receive |
| 2 | Mother's Mobile Phone | Receive all of events | Receive | Does not receive |
| 3 | Living Room's TV | Receive only my event | Does not receive | Receive |
| 4 | My Mobile Phone | Receive all of events | Receive | Receive |
| 5 | Room 1's TV | Does not receive | Does not receive | Receive |

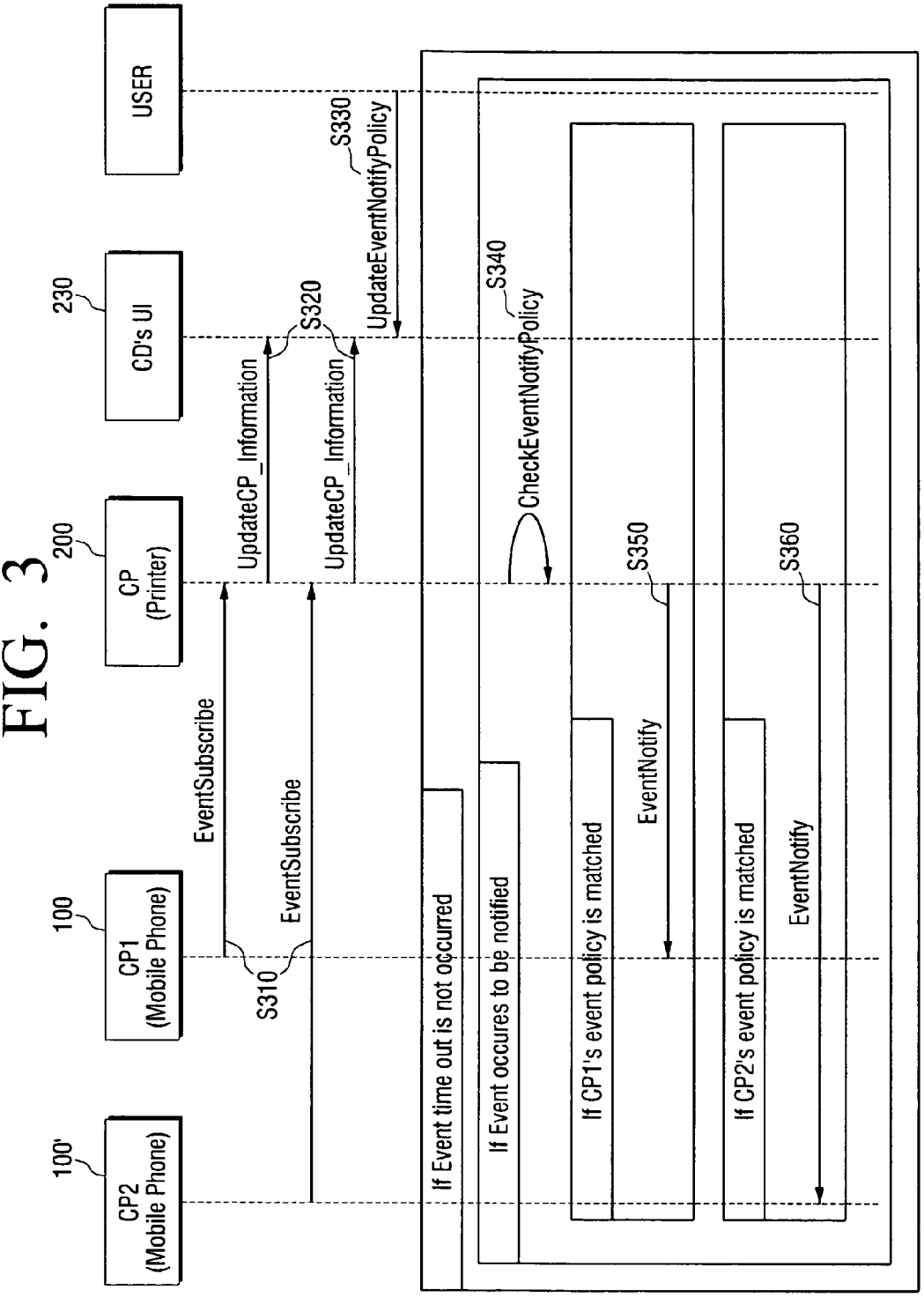

FIG. 4

| | | | Event category | | Actual operation |
|---|---|---|---|---|---|
| Number | CP Name | Event notify method | Printer status | Job status | |
| | | | 284-1 | 284-2 | |
| 281 | 282 | 283 | 284 | | 400 |
| 1 | Father's Mobile Phone | Receive only my event | Receive | Receive | receive only the event generated by the current CP (event generated by other CP is not received) |
| 2 | Mother's Mobile Phone | Receive all of events | Receive | Receive | Receive all events |

401 — row 1
402 — row 2

FIG. 5

| Number | CP Name | Event notify method | Event category | | Actual operation |
| --- | --- | --- | --- | --- | --- |
| | | | Printer status | Job status | |
| 1 | Father's Mobile Phone | Receive only my event | Receive | Receive | Receive event generated by Father's Mobile Phone only |
| 2 | Mother's Mobile Phone | Receive all of events | Receive | Does not receive | Receive events generated by not only Mother's Mobile Phone but also other CP, but exclusively regarding the printer status event |
| 3 | Living Room's TV | Receive only my event | Does not receive | Receive | Receive events generated by the Living Room's TV only, exclusively regarding the events generated regarding printer status event |
| 4 | My Mobile Phone | Receive all of events | Receive | Receive | Receive event generated by not only the My Mobil Phone but also other CP |
| 5 | Room 1's TV | Does not receive | Does not receive | Receive | receive no event |

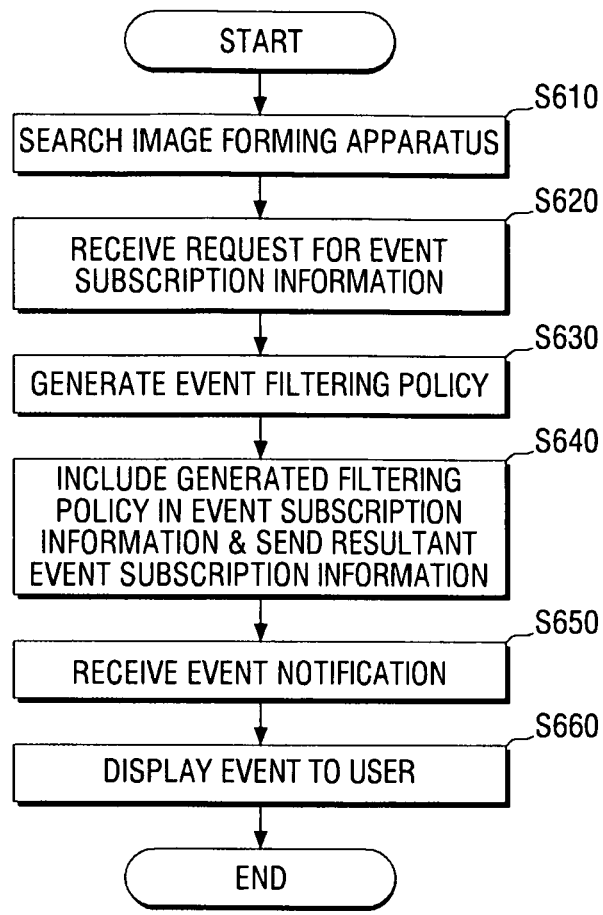

CONTROL POINT, IMAGE FORMING APPARATUS AND METHOD FOR PROCESSING EVENT

CROSS-REFERENCE TO RELATED APPLICATIONS

This application claims the benefit of Korean Application No. 2009-121026, filed Dec. 8, 2009, in the Korean Intellectual Property Office, the disclosure of which is incorporated herein by reference.

BACKGROUND

1. Field

Aspects of the embodiments relate to a control point, an image forming apparatus, and a method for processing an event, and more particularly, to a control point, an image forming apparatus, and a method for processing an event, in which event filtering information is used to selectively notify an event generated in the image forming apparatus to the control point, reducing the load on a digital living network alliance (DLNA) network.

2. Description of the Related Art

Generally, an image forming apparatus such as a copier, a printer, a facsimile, or a multi function peripheral (MFP) which integrates the functions of the copier, printer, facsimile, etc., operate to print the print data generated by a terminal such as a computer onto a recording sheet.

The recent models of image forming apparatus supporting digital living network alliance (DLNA) standard are able to receive the print data from a variety of DLNA apparatuses, as well as a conventional terminal apparatus such as a computer.

The DLNA standard applies to digital information technology industry, and is focused on the interoperability of the devices to share music, photos, videos, or the like. The DLNA aims to achieve convergence between related industries, and establish a platform which is interoperable based on the existent standards of industries. The DLNA works on the introduction of guidelines for industries based on the Universal Plug and Play (UPnP) which is applied widely among the manufacturers of electronic devices, personal computers, and wireless devices.

With the DLNA device, a user is able to access a variety of contents of a DLNA network using a control point, and output desired content through an image forming apparatus connected in the DLNA network.

Meanwhile, in the conventional DLNA environment, if an event occurs in an image forming apparatus, the image forming apparatus notifies the event to all the control points connected in the network. This raises a problem of increased traffic in the DLNA network, since the event is notified to not only a corresponding control point, but also the rest of control points which are not involved with the event. By way of example, the image forming apparatus notifies a print completion event to all the control points including a control point which requested a print job. If the other control points are portable devices connected in Wi-Fi manner, power is consumed additionally due to the unnecessary notification of events.

Another problem of the conventional DLNA environment is that the event of the image forming apparatus is transmitted to the control points in the order the control points are connected to the image forming apparatus. Accordingly, notification to the next control point(s) can be delayed if there is a control point currently disconnected from the DLNA network. It is more problematic if the currently-occurring event expires before being notified due to the delay. Therefore, there is a need for methods by which events occurring in the image forming apparatus can be processed more efficiently.

SUMMARY

Aspects of the embodiments provide a control point, an image forming apparatus, and a method for processing an event, in which event filtering information is used to selectively notify an event generated in the image forming apparatus to the control point, reducing the load on a digital living network alliance (DLNA) network.

In accordance with an example embodiment, there is provided an image forming apparatus connectable to a control point (CP) via a network, which may include a communication interface (CI) to search at least one connectable CP, an event management unit to set event notification information for the searched CP, and if an event occurs in the image forming apparatus, to select the CP to receive a notification of the event based on the event notification information a storage unit to store the set event notification information, and a stack to control the CI so that the event is notified to the selected CP.

According to an aspect, the event management unit sets the event notification information using at least one of: information received from the CP, information set via a user interface (UI) of the image forming apparatus or combinations thereof.

According to an aspect, the event notification information includes at least one of information regarding a name of the CP, information as to whether or not a state of the image forming apparatus is received, information as to whether or not a job status is received, information regarding a recipient of the event or combinations thereof.

According to an aspect, the DLNA stack controls the CI so that the event is notified in an order in which the CP is registered.

According to an aspect, the storage unit stores the event notification information of the CP in the form of a lookup table.

According to an aspect, the image forming apparatus may additionally include a user interface (UI) to display the stored lookup table according to a user input.

According to an aspect, the image forming apparatus may additionally include a user interface (UI) to display information regarding whether or not an event is notified to the CP which is the target recipient of the event.

According to an aspect, the storage unit compares previously-stored event notification information with the event notification information as set, and stores the event notification information as set.

In accordance with another embodiment, there is provided a control point (CP) connectable to an image forming apparatus using a network, which may include a communication interface (CI) to search a connectable image forming apparatus by the network, a stack to generate event notification information based on a condition applied in filtering an event to be received from the image forming apparatus which is found by a search, and a controller to control the CI to transmit the generated event notification information to the found image forming apparatus.

According to an aspect, if a request for event subscription information is received from the found image forming apparatus, the controller controls the CI to include the event notification information in the event subscription information and send the resultant event subscription information to the requesting image forming apparatus as a response.

According to an aspect, the event notification information includes at least one of information regarding a name of the CP, information as to whether or not a state of the image forming apparatus is received, information as to whether or not a job status is received, information as to a recipient of the event or combinations thereof.

According to an aspect, the CP may additionally include a user interface (UI) to display an event to a user based on the generated event notification information, if the event is notified from the found image forming apparatus.

In accordance with yet another example embodiment, there is provided a method for processing an event in an image forming apparatus connectable to a control point (CP) using a network, including searching at least one CP connectable by the network, setting event notification information corresponding to the CP which is found by the searching, storing the set event notification information in the image forming apparatus, selecting the CP to receive a notification of event based on the stored event notification information, if an event occurs in the image forming apparatus, and notifying the event to the selected CP.

According to an aspect, the setting includes setting the event notification information using at least one of information received from the CP, information set via a user interface (UI) of the image forming apparatus or combinations thereof.

According to an aspect, the event notification information includes at least one of information regarding a name of the CP, information as to whether or not a state of the image forming apparatus is received, information as to whether or not a job status is received, information as to a recipient of the event or combinations thereof.

According to an aspect, the notifying includes notifying the event in an order in which the CP is registered.

According to an aspect, the storing includes storing the event notification information of the CP in the form of a lookup table.

According to an aspect, the method may additionally include displaying the stored lookup table according to a user input.

According to an aspect, the method may additionally include displaying information regarding whether or not an event is notified to the CP which is the target recipient of the event.

According to an aspect, the method may additionally include comparing previously-stored event notification information with the event notification information as set.

In accordance with another embodiment, there is provided a method for processing an event in a control point (CP) connectable to an image forming apparatus using a network, which may include searching a connectable image forming apparatus by the network, generating event notification information based on a condition applied in filtering an event to be received from the image forming apparatus which is found by searching, and transmitting the generated event notification information to the found image forming apparatus.

According to an aspect, if a request for event subscription information is received from the found image forming apparatus, the transmitting includes including the event notification information in the event subscription information and sending the resultant event subscription information to the requesting image forming apparatus as a response.

According to an aspect, the event notification information includes at least one of information regarding a name of the CP, information as to whether or not a state of the image forming apparatus is received, information as to whether or not a job status is received, information as to a recipient of the event or combinations thereof.

According to an aspect, the method may additionally include receiving a notification of an event from the found image forming apparatus, and displaying the event to a user based on the generated event notification information.

Additional aspects and/or advantages of the embodiments will be set forth in part in the description which follows and, in part, will be apparent from the description, or may be learned by practice of the invention.

BRIEF DESCRIPTION OF THE DRAWINGS

These and/or other aspects and advantages of the embodiments will become apparent and more readily appreciated from the following description of the embodiments, taken in conjunction with the accompanying drawings of which:

FIG. 1 is a block diagram of a digital living network alliance (DLNA) system according to an example embodiment;

FIG. 2 is a view illustrating a lookup table generated according to an example embodiment;

FIG. 3 is a view explaining a method for processing an event in a DLNA system according to an example embodiment;

FIGS. 4 and 5 are views illustrating an event transmission according to an example embodiment;

FIG. 6 is a flowchart explaining a method for processing an event at a control point according to an example embodiment.

DETAILED DESCRIPTION

Figure 7:
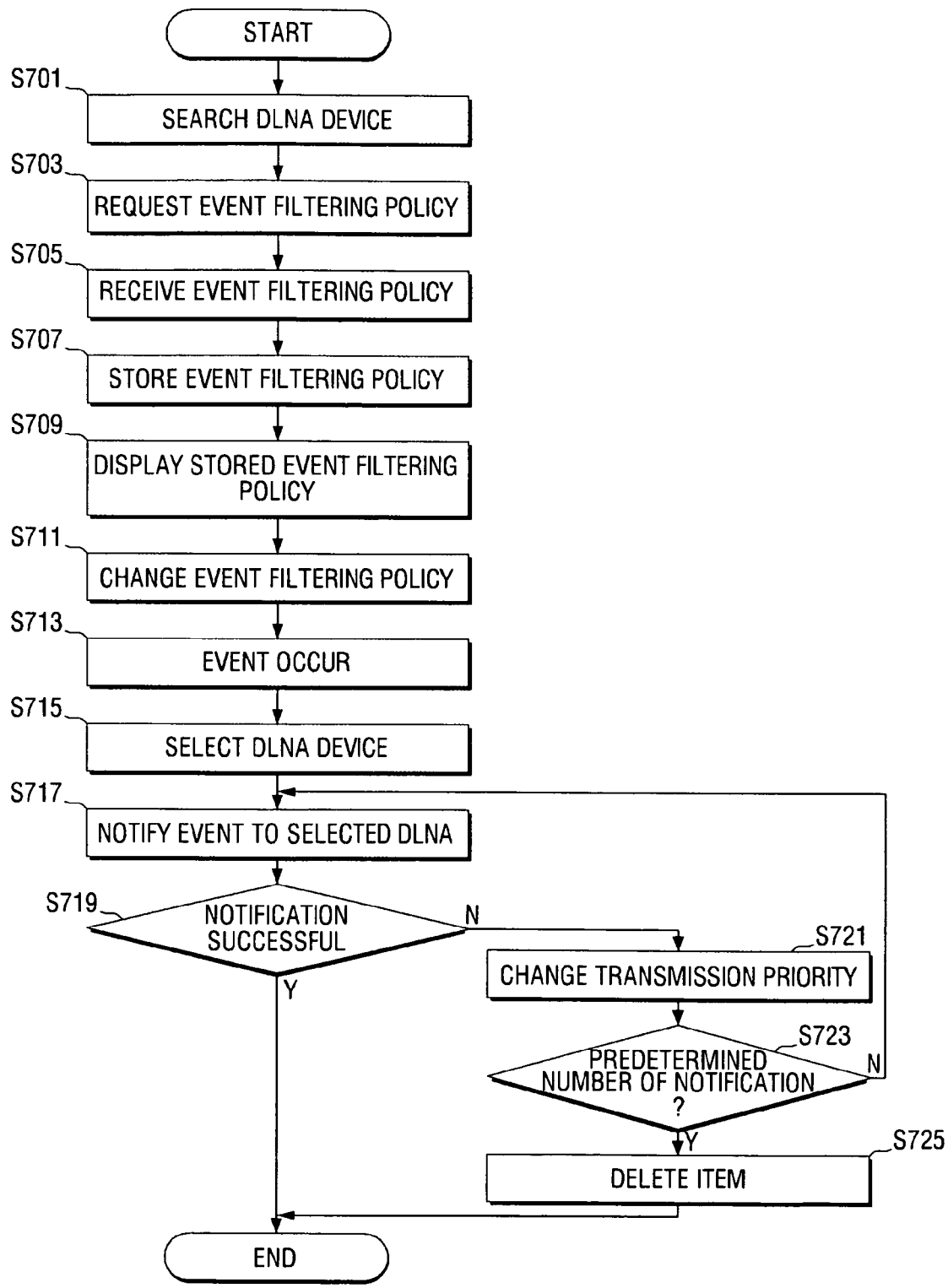
FIG. 7 is a flowchart explaining a method for processing an event in an image forming apparatus according to an example embodiment.

Reference will now be made in detail to the example embodiments o, examples of which are illustrated in the accompanying drawings, wherein like reference numerals refer to like elements throughout. The embodiments are described below in order to explain the aspects by referring to the figures.

FIG. 1 is a block diagram of a digital living network alliance (DLNA) system according to an example embodiment.

Referring to FIG. 1, a DLNA system 1000 includes control points CP (100, 20-1, 20-2, . . . ) and an image forming apparatus 200.

The CP 100 is connected to one or more image forming apparatuses in a DLNA manner, creates information regarding notification of the events (hereinbelow, 'event filtering policy') and transmits the generated event filtering policy to the image forming apparatus 200.

The CP 100 shares contents with the other CPs 20-1, 20-2, . . . in the DLNA network, and connects to the DLNA image forming apparatus 200 in the DLNA network to output the contents. By way of example, the CP may be one of a digital media server (DMS), digital media player (DMP), and digital media renderer (DMR) specified by the DLNA guideline.

The DMS has the function of a media server device (MSD) in UPnP audiovisual (AV) area, and therefore, the DMS provides the digital media contents, and searches the digital media content items in DMS so that a user of the DLNA network can display or distribute the content. By way of example, the DMS may include video cassette recorder (VCR), compact disc (CD) player, digital versatile disk (DVD) player, Moving Picture Experts Group Audio Layer 3 (MP3) player, settop box (STB), TV tuner, radio tuner, or TV.

The DMR has the function of executing the performance of a selected media, and may include a TV, a stereo speaker, or the like. The DMP is a DMR including a CP (that is, UPnP control point) which has the function of a media renderer device (MRD) and a media render control point (MRCP).

Accordingly, the DMP operates to select or control the media content, and execute the selected media content.

Specifically, the CP 100 may include a communication interface (CI) 110, a user interface (UI) 120, a storage unit 130, a DLNA stack 140, and a controller 150.

The CI 110 is connected to the DLNA and shares the contents with the other CPs 20-1, 20-2, . . . in the DLNA network. Specifically, the CI 110 may share the contents stored in the other CPs 20-1, 20-2, . . . by communicating with the other CPs 20-1, 20-2, . . . in the DLNA network according to the UPnP standards.

The 'content' herein may include image data, text, HTML document, or files capable of direct printing. The 'direct printing' herein may refer to a process of carrying out a print job by simply transmitting a file to the image forming apparatus without performing a file conversion. The examples of files capable of direct printing may include Joint Photographic Experts Group (JPG), Portable Document Format (PDF), or Extensible Markup Language (XML) Paper Specification) XPS files.

The CI 110 searches at least one image forming apparatus 200 connected in the DLNA network. The image forming apparatus 200 found by the search may be displayed through the UI 120.

The CI 110 may transmit and receive data to and from the image forming apparatus 200. Specifically, the CI 110 may be connected to the image forming apparatus 200 using, for example, near field communication (NFC), Wi-Fi, or Bluetooth communication, and transmit a print job or content created in the CP 100 to the image forming apparatus 100 according to the DLNA standards and DLNA printer standards.

The CI 110 may also receive a request for event subscription information from the found image forming apparatus 200. As a response, the CI 110 may include the event filtering policy created in the DLNA stack 140 (this will be explained below in detail) in the event subscription information and transmit the resultant information to the requesting image forming apparatus 200. The 'event subscription information' is the information according to the DLNA standards which includes an address and port information of the CP 100 to receive the event notification. The event subscription information may additionally include event filtering policy which will be explained below.

The 'event' herein may include event occurring in relation to the print job or an event occurring in accordance with the change of state of the image forming apparatus 200. By way of example, the event may include a jam event occurring when the image forming apparatus 200 has a paper jam during a printing process, a print completion event occurring when the image forming apparatus 200 finishes the printing process, or a power save event occurring when the image forming apparatus 200 enters into the power save mode.

The CI 110 may receive an event from the image forming apparatus 200 found by the search. The notified event may be displayed to the user through the UI 120.

The UI 120 may include a plurality of function keys so that the user may set or select the functions supported by the CP 100, and also display the information provided by the CP 100. The UI 120 may be a device such as a touchpad which is capable of both inputting and outputting, or as a device which integrates mouse and monitor. Accordingly, through the UI window provided by the UI 120, the user may select the found image forming apparatus 200 and set a desired condition to filter the events sent from the selected image forming apparatus.

Additionally, the UI 120 may indicate a notified event to the user, when the event is notified from the image forming apparatus found by the search. Specifically, the UI 120 determines if the event received via the CI 110 has to be filtered by the event filtering condition which will be explained below, and displays the user only the events determined not restricted by the event filtering condition. The UI 120 may also determine if the received event is necessary to be displayed to the user, before displaying the event unfiltered by the filtering condition.

The storage unit 130 may store the event filtering policy. Specifically, the storage unit 130 may store the event filtering policy created in the DLNA stack 140 which will be explained in detail below. The storage unit 130 may be realized as an internal and external storage medium of the CP 100, including, by way of example, a removable disk including a Universal Serial bus (USB) memory, a storage medium connected to a host, or a web server connected in the network.

The DLNA stack 140 may control the CI 110 to perform communication with the CPs 20-1, 20-2, . . . or the DLNA image forming apparatus 20 in the DLNA network according to the DLNA standards and the DLNA printer standards.

The DLNA stack 140 may generate the event filtering policy using the filtering conditions of the events sent from the found image forming apparatus 200. Specifically, the DLNA stack 140 may generate the event filtering policy using filtering information regarding a job status or a state of the image forming apparatus, or regarding a recipient of the event. The event filtering policy may be created according to a selection by the user, or alternatively, generated based on the predetermined set values. The event filtering policy will be explained in greater detail below with reference to FIG. 2. Although the DLNA stack 140 and the CI 110 are depicted as separate elements from each other in the figures, one will understand that the functions of the DLNA stack 140 and the CI 110 can instead be integrated into one single element.

The controller 150 controls the respective elements of the CP 100. Specifically, upon participating in the DLNA network, the controller 150 controls the CI 110 to find the image forming apparatus to connect to, and controls the DLNA stack 140 to generate the event filtering policy using the conditions to filter the events to be sent from the found image forming apparatus 200.

The controller 150 may also control the CI 110 to transmit the generated event filtering policy to the image forming apparatus 200 found by the search. Specifically, if a request for event subscription information is received from the image forming apparatus 200, the controller 150 may control the CI 110 to include the event filtering policy generated from the DLNA stack 140 into the event subscription information, and send the resultant event subscription information to the image forming apparatus as a response.

Additionally, if an event is notified from the found image forming apparatus, the controller 150 may control the UI 120 to display the notified event. Specifically, if an event is notified from the found image forming apparatus 200 via the CI 110, the controller 150 may determine whether or not the notified event conforms to the filtering conditions generated by the DLNA stack 140, and control the UI 120 to indicate only the events unrestricted by the filtering condition. Meanwhile, if the event filtering policy is transmitted to the found image forming apparatus 200, the image forming apparatus 200 may notify the events unrestricted by the event filtering policy, in which case the operation of determining whether the event conforms to the filtering conditions after reception of the event can be saved.

Since the CP 100 generates event filtering policy using the event filtering conditions and transmits the generated event filtering policy to the image forming apparatus 200, the image forming apparatus 200 selectively transmits events in accordance with the received filtering conditions, thereby reducing load of the DLNA network.

The image forming apparatus 200 is connectable to at least one CP 100, 20-1, 20-2, . . ., and selectively notifies the events generated in the image forming apparatus 200 in accordance with the event filtering policy received from the CP 100.

The 'image forming apparatus 200' herein may refer to a device capable of transmitting and receiving data to and from the CP 100 using near field communication (NFC), Wi-Fi, or Bluetooth communication, such as a printer, facsimile, scanner, or a multi-function peripheral integrating the functions of the apparatuses listed above.

The image forming apparatus 200 may include a communication interface (CI) 210, a storage unit 220, a user interface (UI) 230, an event management unit 240, a DLNA stack 250, an image forming unit 260, and a controller 270.

The CI 210 may transmit and receive data such as print job or content to and from the CP 100, 20-1, 20-2, . . ., in the DLNA network. The CI 210 may be connected to the CP 100 using a variety of communication manners, such as NFC, Wi-Fi, or Bluetooth communication.

The CI 210 may search CPs 100, 20-1, 20-2, . . . in the DLNA network, and request the CP 100, 20-1, 20-2, . . . found by the search to transmit the event filtering policy. The CI 210 may receive the event filtering policy from the respective CPs 100, 20-1, 20-2, . . . as a response to the request. The CI 210 may be capable of requesting the CP 100 to transmit event subscription information, and receiving the event subscription information including the event filtering policy from the CP 100. The event filtering policy received from the CP may include a name of the CP, or information as to whether the state of the image forming apparatus is to be received or not, whether a job status is to be received or not, or whether an event is to be received or not.

The CI 210 may transmit an event generated in the image forming apparatus 200 to the respective CPs based on the event filtering policy received. The above will be explained in detail below with reference to FIGS. 3 to 5.

The storage unit 220 may store the received event filtering policy. Specifically, the storage unit 220 may store the event filtering policy received from the respective CPs via the CI 210, the name of the CP which transmits the event filtering policy, and the order of notifying the event filtering policy, in the form of a lookup table. Specifically, the storage unit 220 may create and store a lookup table as the one illustrated in FIG. 2. The above will be explained in detail below with reference to FIG. 2.

The storage unit 220 may store the event filtering policy received from the user. Specifically, the storage unit 220 may store not only the event filtering policy received via the CI 210, but also the event filtering policy input through the UI 230 which will be explained in detail below.

The storage unit 220 may compare the received event filtering policy with the previously stored event filtering policy. Specifically, in order to avoid overlapping of the event filtering policies on the lookup table, the storage unit 220 may compare the received event filtering policy with the previously stored lookup table and change the lookup table if necessary, before reflecting the received event filtering policy to the lookup table.

The storage unit 220 may also change the stored lookup table according to the user selection, or control by the controller 270. The storage unit 220 may be realized as an internal and external storage medium of the image forming apparatus 200, such as a removable disk including a USB memory.

The UI 230 includes a plurality of function keys with which the user can set or select the functions supported by the image forming apparatus 200, and may display the information provided by the image forming apparatus 200. The UI 230 may be realized as a device such as a touch pad which is capable of both inputting and outputting, or as a device integrating mouse and monitor.

The UI 230 may indicate the stored event filtering policy to the user. Specifically, the UI 230 may indicate the stored lookup table of the event filtering policy related to a plurality of CPs, as the one illustrated in FIG. 2, to the user. If the user wants to change the event filtering as a response, the storage unit 220 may change the stored event filtering policy in accordance with the user's command to change the event filtering policy.

The UI 230 may receive a user's setting regarding the event filtering policy. Specifically, the UI 230 may receive the user's setting regarding the conditions for the events to be sent to the found CP 100.

The UI 230 may display the stored lookup table to the user. Specifically, the UI 230 may display the lookup table stored in the storage unit 220 in relation to the CP. Accordingly, the user may change the event conditions with respect to each of the CP using the displayed lookup table, or set event conditions for the CP for which no event filtering policy is set yet.

The event management unit 240 selects the CP to receive an event notification based on the stored event filtering policy, if the event is generated in the image forming apparatus. By way of example, if an event occurs in relation to a print job, the event management unit 240 may select the CP to receive an event notification only if the CP is the requester of the print job. If an event occurs in relation to a change of a state of the image forming apparatus 200, the event management unit 240 selects a CP to receive an event notification only if the CP is the sender of the filtering policy which indicates an intention to receive the state change event. The above selecting operation of the event management unit 240 will be explained in greater detail below with reference to FIGS. 4 and 5.

The DLNA stack 250 may control the CI 210 to perform communication with the CPs 100, 20-1, 20-2, . . . in the DLNA network according to the DLNA standards and the DLNA printer standards.

The DLNA stack 250 may notify the event to the selected CP 100. Specifically, the DLNA stack 250 may control the CI 210 so that only the event occurring in relation to the CP 100 selected by the event management unit 240 is transmitted to the selected CP 100. The DLNA stack 250 may also control the CI 210 so that the event is notified to the selected CPs in the order the CPs are registered.

The image forming unit 260 may print the received print job received from the CPs 100, 20-1, 20-2, . . . . The image forming unit 260 may also generate an event in relation to the processing of the print job. By way of example, the image forming unit 260 may generate an event regarding the state of the image forming apparatus 200 if a paper jam or paper-out is occurred during printing, or generate an event regarding the job status if the print job is completed.

The controller 270 controls the respective elements of the image forming apparatus 200. Specifically, the controller 270 may request event filtering policies of the CPs 100, 20-1, 20-2, . . . if the CPs 100, 20-1, 20-2, . . . are found through the CI 210. If receiving the event filtering policies via the CI 210 in response to the request, the controller 270 may store the received event filtering policies in the storage unit 220 in the form of a lookup table.

The controller 270 may indicate the lookup table of the event filtering policies stored in the storage unit 220 to the user via the UI 230, and control the storage unit 220 to change the event filtering policies if receiving a request from the user to change the event filtering policies.

If an event occurs in the image forming apparatus 200, the controller 270 determines whether or not the event has to be transmitted to the CP 100, and if so, selects the CP to receive the event notification using the event management unit 240. The controller 270 may additionally control the DLNA stack 250 and the CI 210 to notify the event to the selected CP.

The controller 270 may additionally control the UI 230 to display the result of event notification to the selected CP.

If the notification of event to the selected CP fails, the controller 270 may control the DLNA stack unit 250 and the CI 210 so that the event is notified repeatedly for a predetermined number of times. If the notification of the event is not successful even after the repeated attempts, the controller 270 may re-schedule the order of notifying the event of the corresponding CP, or control the storage unit 220 to delete the items related to the corresponding CP from the lookup table. Although the order of event notification is re-scheduled, or the items related to the CP is deleted from the lookup table after a predetermined number of attempts to notify the event to the CP according to an aspect of the embodiments, one will understand that alternative examples are possible. For example, the re-scheduling or deleting of a related item may directly follow the first failure to notify the event.

As explained above, the image forming apparatus 200 according to an example embodiment selectively transmits an event based on the event filtering policies received from the CPs, and therefore, is able to reduce load of the DLNA network. Additionally, since the image forming apparatus 200 changes the order of notifying the event based on the result of previous attempts to notify the event, delay of event notification due to escape of a CP from the DLNA network is avoided.

FIG. 2 is a view illustrating a lookup table generated according to an example embodiment.

Referring to FIG. 2, the lookup table 280 stored in the storage unit 220 may include an order 281 of notifying an event, a name 282 of CP, and event filtering policies 283, 284.

Specifically, the 'order 281 of notifying an event' refers to an order of transmitting the event as the event occurs in the image forming apparatus 200, This order 281 may be determined initially based on the order of receiving the event filtering policies. The order 281 may be changed later in accordance with the user selection, or the result of previous attempts to notify the events.

The 'name 282 of the CP' refers to the name of the CP which transmits the event filtering policy. By way of example, the name 282 of the CP may be based on the address information of the CP which transmits the event filtering policy.

The 'event filtering policies 283, 284' refer to those requested by the respective CPs, and may include the recipients of the events 283 (hereinbelow, 'filtering conditions') such as 'Receive all events', 'Receive only self-related events', or 'Receive no event', and event receiving categories 284.

Although two event categories 284-1, 284-2 are depicted as the examples of the event categories for reception in the appended drawings, other examples are possible. Accordingly, more than two event categories may be applied, and a variety of filtering conditions other than those illustrated may also be applied adequately.

Furthermore, although FIG. 2 illustrates an example of the lookup table constructed with respect to the CP which transmitted the event filtering conditions, in an alternative example, the lookup table may be constructed with respect to all the connectable CPs, and all or no event may be transmitted to the CP if the CP does not transmit the event filtering conditions.

FIG. 3 is a view explaining a method for processing an event in a DLNA system according to an example embodiment.

Referring to FIG. 3, the CPs 100, 100' transmit to the image forming apparatus 200 the event subscription information including the event filtering policies. Using the received event filtering policies, the image forming apparatus 200 generates a lookup table and displays the generated lookup table to the UI 230. Since the CP 100 transmits the event subscription information before the CP 100', the image forming apparatus 200 may give a higher priority of event notification to the CP 100 in constructing the lookup table.

At S330, if a user inputs a command to change the event filtering policy, the image forming apparatus 200 changes the generated lookup table based on the information input by the user.

At S340, if an event occurs in the image forming apparatus 200, the image forming apparatus 200 selects a CP to receive the notification of the event, based on the lookup table. At S350, S360, the image forming apparatus 200 may notify the event to the selected CPs in the order of notifying the event.

Although the event is notified to two CPs in the example explained above, one will understand that the above way of processing event notification may be applied to a case where there are more than two CPs.

FIGS. 4 and 5 are views illustrating transmitting the event according to an example embodiment of the present invention.

Referring to FIG. 4, the lookup table 400 includes filtering policies regarding 'Father's Mobile Phone' 401, and 'Mother's Mobile Phone' 402.

The filtering policy regarding the 'Father's Mobile Phone' 401 includes the filtering condition that accepts only the events related to the 'Father's Mobile Phone' 401, and the filtering policy regarding the 'Mother's Mobile Phone' 402 includes the filtering condition that accepts all the events related to the entire event categories.

If the image forming apparatus 200, storing therein the above-explained lookup table 400, completes a print job received from the 'Mother's Mobile Phone' 402, the image forming apparatus 200 is allowed to notify the print job completion event only to the 'Mother's Mobile Phone' 402.

If the image forming apparatus 200 storing the lookup table 400 has a jam event, the image forming apparatus 200 notifies the jam event to the 'Father's Mobile Phone' 401 and the 'Mother's Mobile Phone' 402 in order.

If the attempt to notify the event to the 'Father's Mobile Phone' 401 fails due to escape of the 'Father's Mobile Phone' 401 from the DLNA network, the image forming apparatus 200 changes the priority '1' given to the 'Father's Mobile Phone' 401 to priority '2', and may re-notify to the 'Father's Mobile Phone' 401 the successive events following the notification of the event to the 'Mother's Mobile Phone' 402.

Referring to FIG. 5, the lookup table 500 includes the filtering policies regarding 'Father's Mobile Phone' 501, 'Mother's Mobile Phone' 502, 'Living Room's TV' 503, 'My Mobile Phone' 504, and 'Room 1's TV' 505.

Specifically, the filtering policy regarding the 'Father's Mobile Phone' 501 includes a filtering condition which accepts only the related event of the event categories, and the filtering policy regarding the 'Mother's Mobile Phone' 502 includes a filtering condition which accepts only the event within the print status category 284-1.

Additionally, the filtering policy regarding the 'Living Room's TV' 503 includes a filtering condition which accepts only the related events of the job status category 284-2, and the filtering policy regarding the 'My Mobile Phone' 504 includes a filtering condition which accepts all the events within the entire event category 284. Finally, the filtering policy regarding the 'Room 1's TV' 505 includes a filtering condition which accepts no event at all.

Accordingly, if the image forming apparatus 200 storing the above-explained lookup table 500 has a jam event during processing of a print job received from the 'Father's Mobile Phone' 501, the image forming apparatus 200 notifies the jam event to the 'Father's Mobile Phone' 501, the 'Mother's Mobile Phone' 502, and the 'My Mobile Phone' 504 in sequence.

Meanwhile, if the image forming apparatus 200 storing the above-explained lookup table 500 finishes the print job transmitted from the 'Mother's Mobile Phone' 502, the image forming apparatus 200 notifies a print job completion event only to the 'Mother's Mobile Phone' 502.

As explained above, since the image forming apparatus 200 according to an example embodiment selectively notifies the event generated therein based on the event filtering policies received from the respective CPs, the load of the DLNA network is reduced.

FIG. 6 is a flowchart for explaining a method for processing an event at a CP according to an example embodiment.

Referring to FIG. 6, at S610, the CP 100 searches for an image forming apparatus connectable in the DLNA network, using the DLNA.

At S620, if receiving a request for event subscription information from the found image forming apparatus, at S630, the CP 100 generates the event filtering policy using conditions to filter the events to be received, and at S640, includes the generated event filtering policy in the event subscription information and transmits the event subscription information to the requesting image forming apparatus as a response. Since the process of generating and transmitting the event filtering policy is explained above with reference to FIGS. 1 to 5, the repetitious explanation thereof will be omitted for the sake of brevity.

At S650, if the CP 100 receives an event notification from the image forming apparatus, at S660, the CP 100 may display the notified event to the user. Specifically, if the CP 100 receives the event notification from the image forming apparatus 200, the CP determines if the notified event is necessary to be displayed to the user and conform to the filtering policy, and displays only if the event is necessary to be displayed and not filtered by the filtering conditions. Meanwhile, if the image forming apparatus 200 has received the event filtering policies, the image forming apparatus 200 may notify only the events unrestricted by the event filtering policies, thereby saving operations at the CP 100 to determine whether the received event conforms to the event filtering policies or not.

Accordingly, with the method of processing an event at the CP according to an example embodiment, since the event filtering policies are generated using the conditions to filter the events and transmitted to the image forming apparatus 200, the image forming apparatus 200 selectively transmits the events according to the received filtering policies. As a result, load of the DLNA network can be reduced. The method of processing an event as the one illustrated in FIG. 6 may be applied to the CP 100 illustrated in FIG. 1, or to other types of CPs.

FIG. 7 is a flowchart for explaining a method for processing an event in an image forming apparatus according to an example embodiment.

At S701, the image forming apparatus searches for a connectable CP. Specifically, the image forming apparatus may search every CP connected in the DLNA network.

At S703, the image forming apparatus requests the found CP for event filtering policy, and at S705, receives the event filtering policy of the found CP as a response. Alternatively, the image forming apparatus may request the found CP for the event subscription information including the event filtering policy therein, and receives the event subscription information including the event filtering policy as a response, so that the image forming apparatus can use the event filtering policy.

At 5707, the image forming apparatus may store the received event filtering policy. Specifically, the received event filtering information, the name of the CP which transmitted the event filtering information, and the order of notifying an event may be stored in the form of a lookup table.

At S709, the image forming apparatus may display the stored event filtering policy to the user, and receive a user's command to change the displayed event filtering policy. Therefore, if the user inputs a command to change the event filtering policy, at S711, the image forming apparatus changes the stored lookup table accordingly an Alternatively, the operations at S709, S711 may be omitted.

At S713, if an event occurs regarding a change of the state of the image forming apparatus 200 or regarding a print job processing, at S715, the image forming apparatus selects a CP to receive an event notification based on the stored event filtering policy, and at S717, notifies the event to the selected CP. Since the process of selecting CP and notifying an event to the selected CP is explained in detail below with reference to FIGS. 1 to 5, the repetitious explanation thereof will be omitted for the sake of brevity.

At S719, if an attempt to notify the event to the selected CP fails, at S721, the image forming apparatus changes a priority to notify the event, and may re-notify the event to the corresponding CP after notification to the other CPs in the schedule is finished.

At S723, if the re-trials to notify the event to the CP fails for a predetermined number of times, at S725, the image forming apparatus may delete the items related to the notification-failed CP from the lookup table.

As described above, since the method of processing an event of the image forming apparatus selectively transmits an event based on the event filtering policies received from the CPs, load of the DLNA network can be reduced. Furthermore, since it is possible to change the order of notifying an event based on the result of previous attempts to notify the event, delay of notifying an event due to escape of a CP from the DLNA network can be avoided. The method for processing an event illustrated in FIG. 7 may also be applied to the image forming apparatus 200 illustrated in FIG. 1, or to other types of image forming apparatuses.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

What is claimed is:

1. An image forming apparatus connectable to a control point (CP) via a network, the image forming apparatus comprising:
    a communication interface (CI) to search at least one connectable CP;
    an event management unit to set event notification information for the searched CP, and if an event occurs in the image forming apparatus, to select the CP to receive a notification of the event based on the event notification information;
    a storage unit to store the set event notification information;
    a stack to control the CI so that the event is notified to the selected CP; and
    a user interface (UI),
    wherein the event management unit sets the event notification information using at least one of information received from the CP, information set via the user interface apparatus or combinations thereof.

2. The image forming apparatus of claim 1, wherein the event notification information comprises at least one of information regarding a name of the CP, information as to whether or not a state of the image forming apparatus is received, information as to whether or not a job status is received, information regarding a recipient of the event or combinations thereof.

3. The image forming apparatus of claim 1, wherein the stack controls the CI so that the event is notified in an order in which the CP is selected.

4. The image forming apparatus of claim 1, wherein the storage unit stores the event notification information of the CP in the form of a lookup table.

5. The image forming apparatus of claim 4, further comprising a user interface (UI) to display the stored lookup table according to a user input.

6. The image forming apparatus of claim 1, further comprising a user interface (UI) to display information regarding whether or not an event is notified to the CP which is the target recipient of the event.

7. The image forming apparatus of claim 1, wherein the storage unit compares previously-stored event notification information with the event notification information as set, and stores the event notification information as set.

8. The image forming apparatus of claim 1, wherein the network is a digital living network alliance (DLNA) network, and the stack is a DLNA stack.

9. A control point (CP) connectable to an image forming apparatus using a network, the CP comprising:
    a communication interface (CI) to search a connectable image forming apparatus by the network;
    a stack to generate event notification information based on a condition applied in filtering an event to be received from the image forming apparatus which is found by a search; and
    a controller to control the CI to transmit the generated event notification information to the found image forming apparatus.

10. The CP of claim 9, wherein, if a request for event subscription information is received from the found image forming apparatus, the controller controls the CI to include the event notification information in the event subscription information and send the resultant event subscription information to the requesting image forming apparatus as a response.

11. The CP of claim 9, wherein the event notification information comprises at least one of information regarding a name of the CP, information as to whether or not a state of the image forming apparatus is received, information as to whether or not a job status is received, information as to a recipient of the event or combinations thereof.

12. The CP of claim 9, further comprising a user interface (UI) to display an event to a user based on the generated event notification information, if the event is notified from the found image forming apparatus.

13. The CP of claim 9, wherein the network is a digital living network alliance (DLNA) network, and the stack is a DLNA stack.

14. A method for processing an event in an image forming apparatus connectable to a control point (CP) using a network, the method comprising:
    searching at least one CP connectable by the network;
    setting event notification information corresponding to the CP which is found by the searching;
    storing the set event notification information in the image forming apparatus;
    selecting the CP to receive a notification of event based on the stored event notification information, if an event occurs in the image forming apparatus; and
    notifying the event to the selected CP,
    wherein the setting comprises setting the event notification information using at least one of information received from the CP, information set via a user interface (UI) of the image forming apparatus or combinations thereof.

15. The method of claim 14, wherein the event notification information comprises at least one of information regarding a name of the CP, information as to whether or not a state of the image forming apparatus is received, information as to whether or not a job status is received, information as to a recipient of the event or combinations thereof.

16. The method of claim 14, wherein the notifying comprises notifying the event in an order in which the CP is selected.

17. The method of claim 14, wherein the storing comprises storing the event notification information of the CP in the form of a lookup table.

18. The method of claim 17, further comprising displaying the stored lookup table according to a user input.

19. The method of claim 14, further comprising displaying information regarding whether or not an event is notified to the CP which is the target recipient of the event.

20. The method of claim 14, further comprising comparing previously-stored event notification information with the event notification information as set.

21. The method of claim 14, wherein the network is a digital living network alliance (DLNA).

22. A method for processing an event in a control point (CP) connectable to an image forming apparatus using a network, the method comprising:
    searching a connectable image forming apparatus by the network;
    generating event notification information based on a condition applied in filtering an event to be received from the image forming apparatus which is found by searching; and
    transmitting the generated event notification information to the found image forming apparatus.

23. The method of claim 22, wherein, if a request for event subscription information is received from the found image forming apparatus, the transmitting comprises including the event notification information in the event subscription information and sending the resultant event subscription information to the requesting image forming apparatus as a response.

24. The method of claim 22, wherein the event notification information comprises at least one of information regarding a name of the CP, information as to whether or not a state of the image forming apparatus is received, information as to whether or not a job status is received, information as to a recipient of the event or combinations thereof.

25. The method of claim 22, further comprising:
receiving a notification of an event from the found image forming apparatus; and
displaying the event to a user based on the generated event notification information.

26. The image forming apparatus of claim 22, wherein the network is a digital living network alliance (DLNA) network.

* * * * *